US010223398B2

(12) United States Patent
Qin et al.

(10) Patent No.: US 10,223,398 B2
(45) Date of Patent: Mar. 5, 2019

(54) MERGING FILTERED OUT ANOMALY DATA WITH NORMAL DATA FROM DEVICE POLLING

(71) Applicant: CA, Inc., New York, NY (US)

(72) Inventors: Zubing Robin Qin, Southborough, MA (US); Yang Yang, Newton, MA (US); Fei Gu, Newton, MA (US)

(73) Assignee: CA, Inc., New York, NY (US)

( * ) Notice: Subject to any disclaimer, the term of this patent is extended or adjusted under 35 U.S.C. 154(b) by 218 days.

(21) Appl. No.: 15/220,572

(22) Filed: Jul. 27, 2016

(65) Prior Publication Data

US 2018/0032563 A1    Feb. 1, 2018

(51) Int. Cl.
  *G06F 17/30*  (2006.01)
(52) U.S. Cl.
  CPC ............... *G06F 17/30342* (2013.01)
(58) Field of Classification Search
  CPC ................................................ G06F 17/30
  USPC ......................................................... 707/746
  See application file for complete search history.

(56) References Cited

U.S. PATENT DOCUMENTS 7,649,853 B1 * 1/2010 Nucci et al. ........... H94K 12/28
2017/0048126 A1 * 2/2017 Handige Shankar ......................
                                                H04L 41/069

OTHER PUBLICATIONS

Brauckhoff, et al., "Anomaly Extraction in Backbone Networks Using Association Rules", IEEE/ACM Transactions on Networking, vol. 20, No. 6,, Dec. 2012, 12 pages.
Soule, et al., "Combining Filtering and Statistical Methods for Anomaly Detection", USENIX Association, Internet Measurement Conference 2005, 14 pages.

* cited by examiner

*Primary Examiner* — Hung T Vy
(74) *Attorney, Agent, or Firm* — Gilliam IP PLLC

(57) ABSTRACT

For each of a plurality of time intervals over which metric data is collected from periodic polling of a network of devices, a determination is made of whether metric data of the time interval satisfies a criterion for normal data values defined for a metric corresponding to the metric data. The metric data is marked as anomaly data, in response to determining that the metric data does not satisfy the criterion defined for the metric corresponding to the metric data of the time interval. The metric data is marked as normal data, in response to determining that the metric data satisfies the criterion defined for the metric corresponding to the metric data of the time interval. The metric data marked as normal data is stored in a first database, and the metric data marked as anomaly data and corresponding time intervals in a second database.

20 Claims, 11 Drawing Sheets

| | Polling Period | Current Counter Value | Previous Counter Value | Delta ($t_n - t_{n-1}$) |
|---|---|---|---|---|
| 312 | $t_1$ | 11 | 9 | 2 |
| 314 | $t_2$ | 12 | 11 | 1 |
| 316 | $t_3$ | 3 | 12 | -9̶ |
| 318 | $t_4$ | 16 | 3 | 1̶3̶ |
| 320 | $t_5$ | 17 | 16 | 1 |
| 322 | $t_6$ | 18 | 17 | 1 |

FIG. 3

MERGING FILTERED OUT ANOMALY DATA WITH NORMAL DATA FROM DEVICE POLLING

BACKGROUND

The disclosure generally relates to the field of data processing, and more particularly to merging filtered out anomaly data with normal data received in response to polling of a device.

Polling of a device refers to periodic sampling of a device to determine its status, performance, etc. Polling can be a synchronous activity that is performed by an application executing on another device. For example, applications can periodically poll a variety of different devices to collect and analyze data related to the devices' health, performance, etc. Collection and analysis of this data can also be graphically displayed to help users analyze the data.

BRIEF DESCRIPTION OF THE DRAWINGS

Embodiments of the disclosure may be better understood by referencing the accompanying drawings.

FIG. 3 depicts a table of data received in response to polling a device (polled data), according to some other embodiments.

DESCRIPTION

Figure 1:
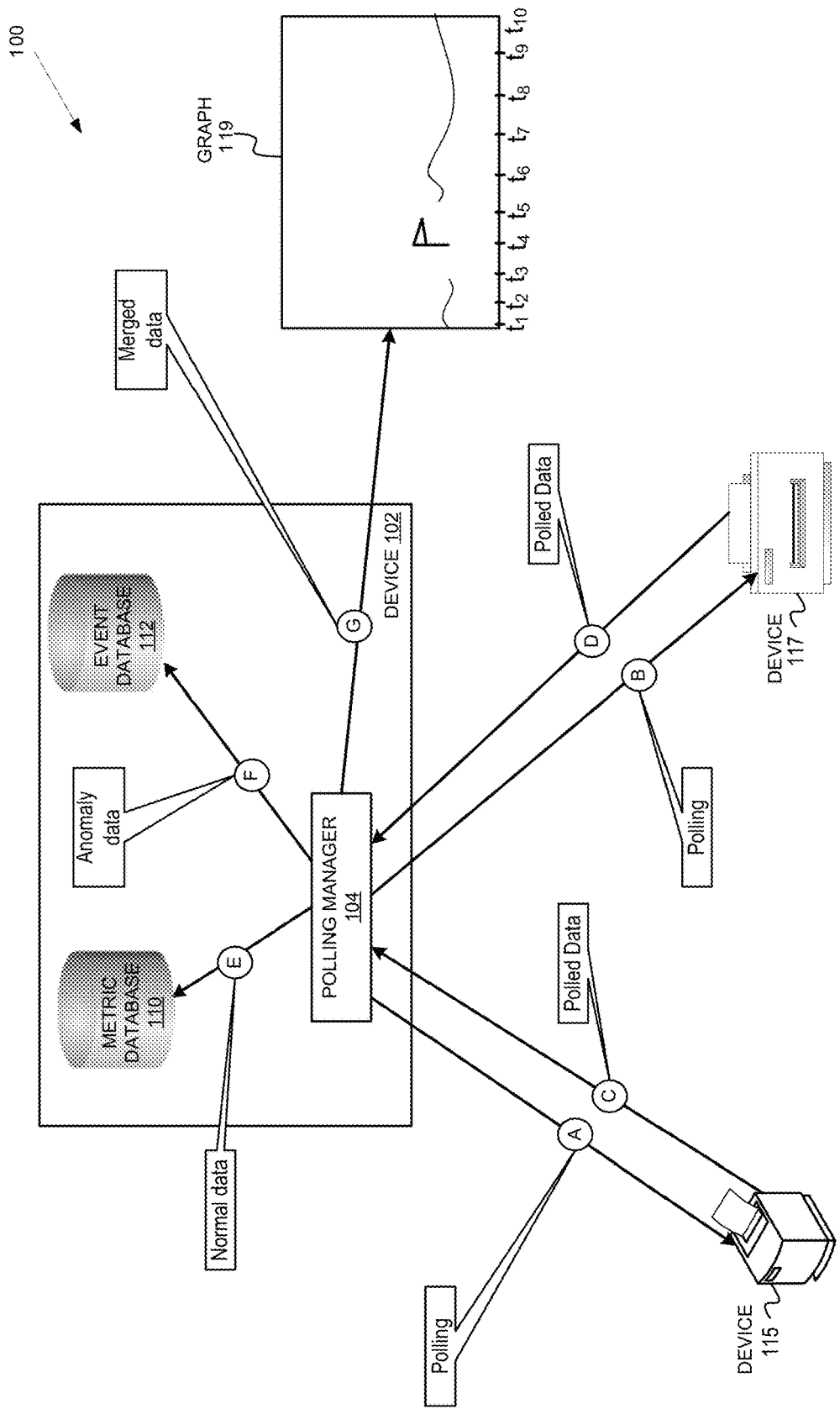
FIG. 1 depicts an example system for merging of filtered out anomaly polled data with normal polled data received in response to polling a device, according to some embodiments.

The description that follows includes example systems, methods, techniques, and program flows that embody aspects of the disclosure. However, it is understood that this disclosure may be practiced without these specific details. For instance, this disclosure refers to using a Simple Network Management Protocol (SNMP) for polling communications in illustrative examples. But aspects of this disclosure can be applied to other types of communication protocols for polling communications (e.g., Internet Control Message Protocol (ICMP)). In other instances, well-known instruction instances, protocols, structures and techniques have not been shown in detail in order not to obfuscate the description.

Terminology

This description uses the terms "normal data" and "anomaly data" in the context of polled data received from devices being polled regarding the device's status, health, performance, etc. Anomaly data can refer to any type of data that is not normal data. The criterion for determining whether data is normal or not varies depending upon the type of data. A criterion may be range based, threshold based, directional transition based (i.e., delta based), etc., depending upon type of data. Furthermore, the criterion may be applied to the polled data itself and/or applied to a value(s) based on or derived from the polled data. As an example of data that is subject to a directional transition based criterion for a normal characterization, polled data may be a value of an incremental counter that increases until a maximum value is reached. After reaching the maximum value, the counter is reset to its initial value (e.g., one). For these cases, anomaly data can be defined in terms of the difference or delta between the current polled data and a previous polled data (the delta value). In this example, for the polled data to be classified as normal data, the delta value should be a positive value because the value of the incremental counter should be increasing over time. Therefore, the polled data may be anomaly data if the delta is a negative value because the current value of the incremental counter is less than the previous value of the incremental counter in this situation. To mark the polled data as anomaly data in this situation, it is determined that the delta value is not a negative value because the counter has been reset to its starting value. If the delta value is a negative value because the counter has been reset, the polled data is not anomaly data. In some embodiments, a polling manager can determine whether the counter has been reset by adding a large value (test add value) to the delta value. For example, the test add value can be $2^{32}$. If the result of adding the test add value to the delta value is greater than a threshold (e.g., two billion), the determination is made that the delta value is negative because the counter has been reset. In this instance, the polled data is normal data (and it not an anomaly). Conversely, if the result of adding the test add value to the delta value is less than the threshold, the determination is made that the delta value being negative is not the result of the counter being reset. In this instance, the polled data is anomaly data.

In cases of range based criteria applied to the polled data, normal data can be defined as any data within an acceptable data range, while anomaly data can be defined as any data outside the acceptable data range. To illustrate, assume normal data is any data within a range of 100-200. In this instance, anomaly data is any data having a value below 100 or above 200. For cases of threshold based criterion applied to a derivative of polled data, anomaly data can also be data having a value whose difference in comparison to other polled data is greater than a threshold. For example, assume that the threshold is 100. If an average value of other polled data is 500, a value of the current polled data needs to be between 400 and 600 to be defined as normal data. Otherwise, the current polled data is defined as anomaly data. In other instances, the value that is compared to the current polled data is an expected value. For example, assume that a variance threshold is 100. If an expected value of other polled data is 1000, a value of the current polled data will be considered normal if it lies between 900 and 1100. Otherwise, the current polled data is defined as anomaly data. Also, instead of comparing the current polled data to an average value or expected value, a value of the current polled data can be compared to any other polling data, one or more prior polling data, one or more subsequent polling data, other polling data in a range on either side of the current polling data, etc.

This description uses the term "graph" to refer to any diagram depicting the relationship between or among different polling values that have been received in response to polling a device regarding its status, performance, etc. The graph can include a line, curve, bars, etc. For example, the graph can be a line graph, a bar graph, etc.

Overview

Embodiments relate to periodic polling of devices to collect various data related to any metric. For example, the polled data can be related to the device's health, performance, etc. Examples of metric data can be data defining a device's health or performance (e.g., execution time, number of Input/Output (I/O) operations per unit of time, value of a counter, etc.), status, etc. This data can be graphically displayed to allow a user to analyze the polled data. For example, the data can be displayed in graphs (e.g., line graph), charts, etc. In some instances, the polled data are considered abnormal or anomaly data. For example, polled data can be defined as anomaly data at a given time point that is a "spike" relative to the other polled data.

In some embodiments, the anomaly data is detected and removed from the other normal data to preclude the anomaly data from skewing results, analysis, outputs, etc. derived from the normal data. However, some embodiments still provide output of the polled data to notify users of the anomaly data. Such notification provides for analysis of the normal data while still allowing for the determination and correction of the problems causing the anomaly data. For example, the polled data can be graphically displayed in a graph (e.g., a line graph). However, in some embodiments, during creation of the graph, the anomaly data is not used. Rather a flag, marker or other type of indicator can be added to the graph to denote that anomaly data has occurred. For instance, a flag can be added along the line graph at a point where the anomaly data occurred relative to the timing of the other normal polling data. Accordingly, a graph can be displayed based on normal data without being skewed by anomaly data, while still including notification of the anomaly data within the graph.

Example System Architecture

Figure 11:
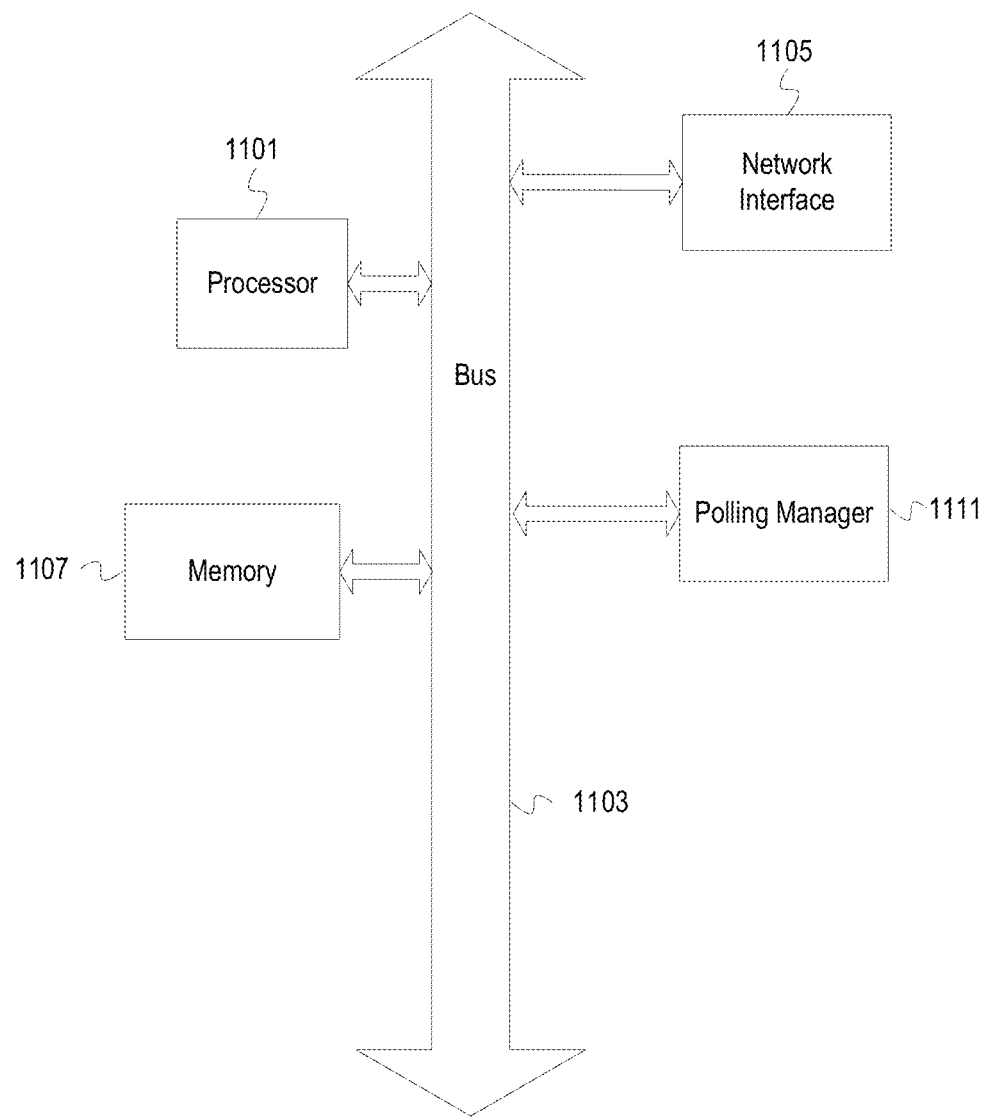
FIG. 11 depicts an example computer device.

FIG. 1 depicts an example system for merging of filtered out anomaly polled data with normal polled data received in response to polling a device, according to some embodiments. A system 100 of FIG. 1 includes a device 102 that is communicatively coupled to a device 115 and communicatively coupled to a device 117. The device 102 includes a polling manager 104, a metric database 110, and an event database 112. The polling manager 104 can be software, firmware, hardware or a combination thereof. For example, the polling manager 104 can be software executing on a processor(s). One such example is depicted in FIG. 11, which is described in more detail below.

In FIG. 1, the polling manager 104 is periodically polling the device 115 and the device 117. For instance, the polling manager 104 can periodically poll the devices 115-117 for their status, their performance, their health or any other type of metric. The devices 115-117 can be various types of devices that can communicate their status, performance, etc. to the polling manager 104. For example, the devices can be servers, routers, printers, communication switches, sensors, controllers, etc. Also, instead of devices or hardware, the polling manager 104 can poll programs, applications, etc.

FIG. 1 also depicts a graph 119 that is output by the polling manager 104. For instance, the polling manager 104 can output the graph 119 on a display device.

FIG. 1 is annotated with a series of letters A-G. These letters represent stages of operations or communications, with each stage representing one or more operations or communications. Although these stages are ordered for this example, the stages illustrate one example to aid in understanding this disclosure and should not be used to limit the claims. Subject matter falling within the scope of the claims can vary with respect to the order and some of the operations.

At stages A-B, the polling manager 104 polls or queries the device 115 and the device 117, respectively. This polling of the two devices can be performed at least partially in parallel. Also while FIG. 1 depicts two devices, the polling manager 104 can poll one to any number of devices. Additionally, the polling manager 104 can poll for any type of metric data from the devices 115-117. Examples of metric data can be data defining a device's health or performance (e.g., execution time, number of Input/Output (I/O) operations per unit of time, value of a counter, etc.), status, etc. In some embodiments, the polling manager 104 polls the devices 115-117 using SNMP. Also, the polling manager 104 can poll at periodical intervals.

At stages C-D, the device 115 and the device 117 responds with the requested metric data (the polled data). In particular, at stage C, the device 115 transmits polled data back to the polling manager 104 in response to the polling at each polling interval from stage A. Similarly, at stage D, the device 117 transmits polled data back to the polling manager 104 in response to the polling at each polling interval from stage B. The polling and responses can continue indefinitely or stop or reset after N number of times. If indefinitely, the processing to output a report, graph, chart, etc. (as described below) can be performed after X number of polling and responses (even while the polling and responses continue to be performed).

Figure 2:
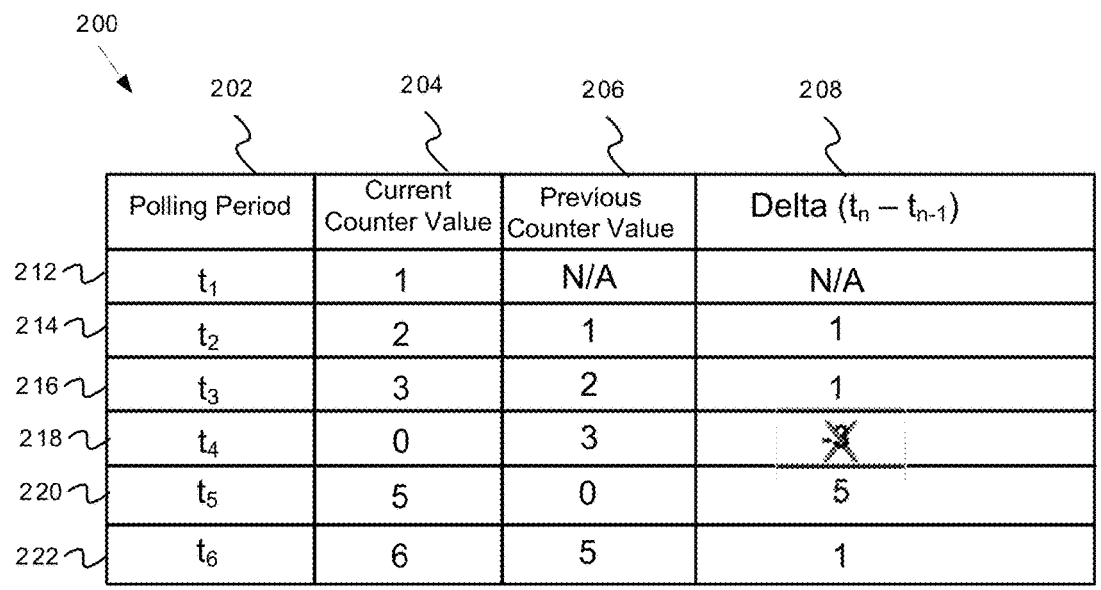
FIG. 2 depicts a table of data received in response to polling a device (polled data), according to some embodiments.

At stages E-F, the polling manager 104 separates the polled data received in the responses into two separate databases. In particular, in response to receiving polled data, the polling manager 104 determines whether the polled data is normal data or anomaly data. An example where the polled data is a value of an incremental counter is depicted in FIG. 2, which is described in more detail below. Polled data can be defined as normal or anomaly data based on other criteria. For example, if within an acceptable range, the polled data is defined as normal data. If outside the acceptable range, the polled data is defined as anomaly data. For example, assume the number of I/Os for a device per unit of time has an acceptable range of 5000-7500, if the polled data is within this range (e.g., 5501), the polled data is marked as normal data. If the polled data is not within this range (e.g., 7601, 2, etc.), the polled data is marked as anomaly data. The polled data can be defined as either normal data or anomaly data based on various criteria. Examples of such criteria is described above in the terminology section.

At stage G, the polling manager 104 outputs merged data for display as the graph 119. As further described below, the polling manager 104 loads the normal data from the metric database 110 and loads the anomaly data from the event database 112 for a particular polling of a particular device. For instance, the polling manager 104 can retrieve the normal data from the metric database 110 and the anomaly data from the event database 112. The polling manager 104 can then load the normal data and the anomaly data into a volatile memory of the device 102. The polling manager 104 then correlates the normal data and the anomaly data based on the timing of the polling. For example, assume the polled data includes normal data at time points $t_1$, $t_2$, $t_4$, $t_5$, $t_7$, and $t_8$ and includes anomaly data at time points $t_3$, and $t_6$. In this example, the polling manager 104 merges the normal data with the anomaly data as follows: normal data at time point $t_1$ is followed by normal data at time point $t_2$ which is followed by anomaly data at time point $t_3$ which is followed by normal data at time point $t_4$ which is followed by normal data at time point $t_5$ which is followed by anomaly data at time point $t_6$ which is followed by normal data at time point $t_7$ which is followed by normal data at time point $t_8$.

Figure 6:
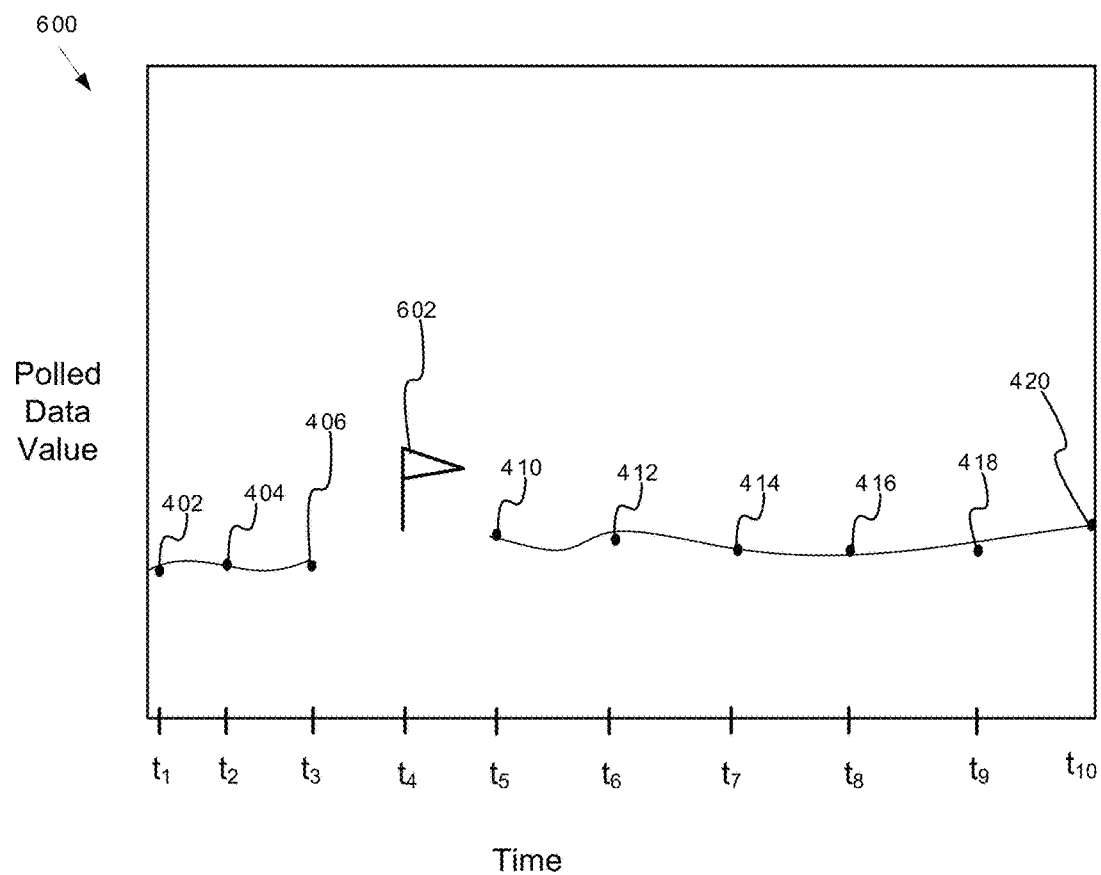
FIGS. 6-7 depicts the graph of FIG. 3 without anomaly data while still providing notification of the anomaly data, according to some embodiments.
Figure 7:
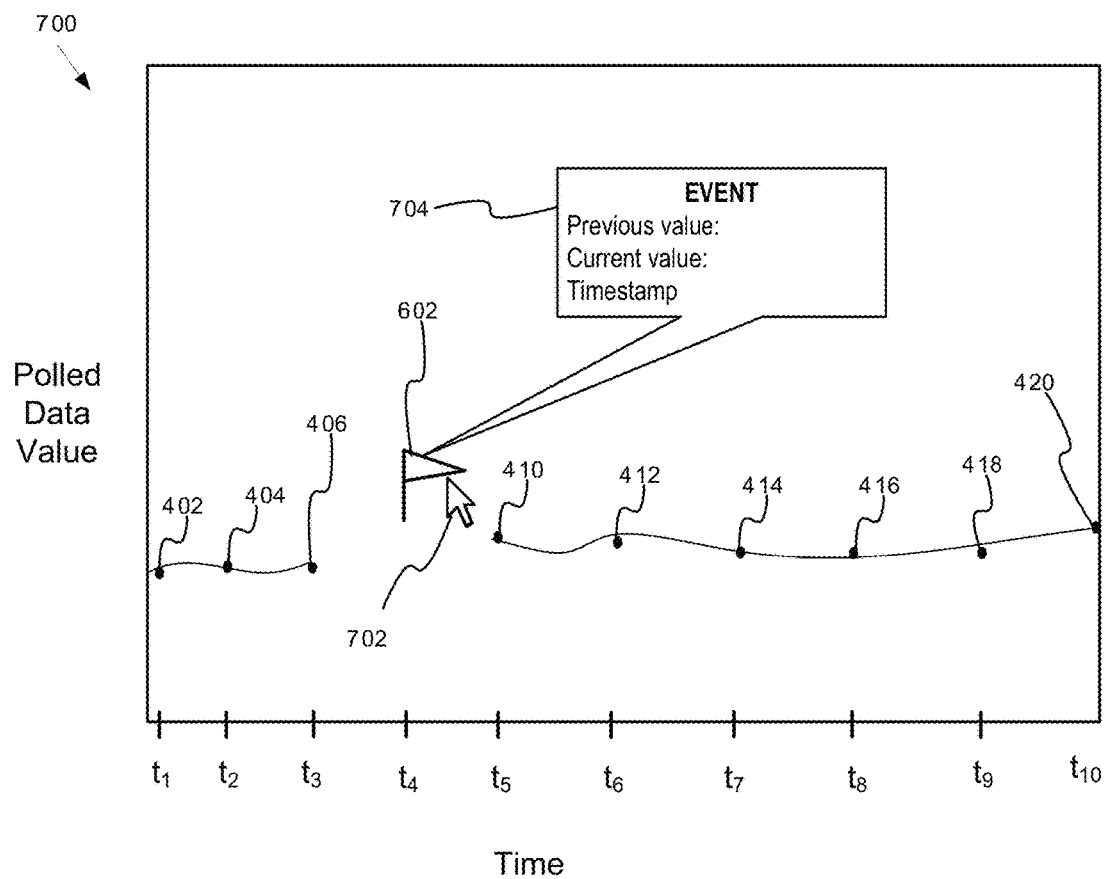

Also, after merging of the data, the polling manager 104 can then create the graph 119 for display. The polling manager 104 creates the graph 119 using the normal data. For example, the polling manager 104 creates a line graph by plotting the data points for the normal data. The graph 119 includes a gap where anomaly data has occurred. Accordingly, a user is able to view the line graph having meaningful data that is not skewed by anomaly data. The polling manager 104 can display a flag or other marker where the anomaly data occurred. Such a display will provide notification to a user that an error occurred. Thus, the graph 119 provides meaningful unskewed data while still providing notification of any anomaly data. More detailed examples of the graph 119 are depicted in FIGS. 6-7, which are described in more detail below.

Example Tables of Metric Data for an Incremental Counter

FIGS. 2-3 are now described. FIG. 2 depicts a table of data received in response to polling a device (polled data), according to some embodiments. A table 200 of FIG. 2 includes example polled data received in response to polling a device regarding a value of an incremental counter. In this example, normal data for the incremental counter should be a sequential value increasing over time. The table 200 includes a column 202, a column 204, a column 206, and a column 208. The column 202 includes the polling period (a time of the poll (e.g., every five minutes)). The column 204 includes a current value of the incremental counter being polled. The column 206 includes a previous value of the incremental counter being polled. The column 208 includes a delta value that provides a difference between the current value of the incremental counter ($t_n$) and the previous value of the incremental counter ($t_{n-1}$).

The table 200 also includes rows 212-222. The row 212 includes a value of 1 for the incremental counter at a polling period of $t_1$. Because this is the first polling period, the delta relative to the previous value is not applicable (N/A). The row 214 includes a value of 2 for the incremental counter at a polling period of $t_2$. The delta at the polling period $t_2$ equals the current value of the incremental counter (2) minus the previous value of the incremental value at the polling period $t_1$ (1)→1. The row 216 includes a value of 3 for the incremental counter at a polling period of $t_3$. The delta at the polling period $t_3$ equals the current value of the incremental counter (3) minus the previous value of the incremental counter at the polling period $t_2$ (2)→1. The row 218 includes a value of 0 for the incremental counter at a polling period of $t_4$. The delta at the polling period $t_4$ equals the current value of the incremental counter (0) minus the previous value of the incremental value at the polling period $t_3$ (3)→−3. The row 220 includes a value of 5 for the incremental counter at a polling period of $t_5$. The delta at the polling period $t_5$ equals the current value of the incremental counter (5) minus the previous value of the incremental value at the polling period $t_4$ (0)→5. The row 222 includes a value of 6 for the incremental counter at a polling period of $t_6$. The delta at the polling period $t_6$ equals the current value of the incremental counter (6) minus the previous value of the incremental value at the polling period $t_5$ (5)=1.

In this example, for the polled data to be classified as normal data, the delta value should be a positive value because the value of the incremental counter should be increasing over time. Therefore, the polled data may be anomaly data if the delta is a negative value because the current value of the incremental counter is less than the previous value of the incremental counter in this situation. For the table 200, the only polling period having a delta that is negative is $t_4$.

To mark the polled data as anomaly data in this situation, the polling manager 104 needs to verify that the delta is not a negative value as a result of the counter being reset to its starting value. If the delta is a negative value because the counter has been reset, the polled data is not anomaly data. In some embodiments, the polling manager 104 can determine whether the counter has been reset by adding a large value (test add value) to the delta value. For example, the test add value can be $2^{32}$. If the result of adding the test add value to the delta value is greater than a threshold (e.g., two billion), the polling manager 104 determines that the delta value is negative because the counter has been reset. In this instance, the polled data is normal data (and it not an anomaly). Conversely, if the result of adding the test add value to the delta value is less than the threshold, the polling manager 104 determines that the delta value being negative is not the result of the counter being reset.

For this example, it is assumed that adding the test add value to the delta value is less than the threshold. Therefore, in this instance, the polled data is anomaly data. In other words, the current counter value at the polling period $t_4$ is marked as anomaly data because the negative value is not a result of the counter being reset to its starting value. For the table 200, only one current counter value is marked as anomaly data.

FIG. 3 depicts a table of data received in response to polling a device (polled data), according to some other embodiments. In contrast to the table 200 of FIG. 2, a table 300 of FIG. 3 includes a next counter value marked as anomaly data after a current counter value is marked as anomaly data. In particular, the next counter value is marked as anomaly data even if it has a value that is not defined as anomaly data.

Similar to the table 200, the table 300 of FIG. 3 includes example polled data received in response to polling a device regarding a value of an incremental counter. In this example, normal data for the incremental counter increasing over time. The table 300 includes a column 302, a column 304, a column 306, and a column 308. The column 302 includes the polling period (a time of the poll (e.g., every five minutes)). The column 304 includes a current value of the incremental counter being polled. The column 306 includes a previous value of the incremental counter being polled. The column 308 includes a delta value that provides a difference between the current value of the incremental counter ($t_n$) and the previous value of the incremental counter ($t_{n-1}$).

The table 300 also includes rows 312-322. The row 312 includes a current value of 11 and a previous value of 9 for the incremental counter at a polling period of $t_1$. The delta at the polling period $t_1$ equals the current value of the incremental counter (11) minus the previous value (9) of the incremental value at the polling period $t_1$→2. The row 314 includes a current value of 12 for the incremental counter at a polling period of $t_2$. The delta at the polling period $t_2$ equals the current value of the incremental counter (12) minus the previous value of the incremental value at the polling period $t_1$ (11)→1. The row 316 includes a value of 3 for the incremental counter at a polling period of $t_3$. The delta at the polling period $t_3$ equals the current value of the incremental counter (3) minus the previous value of the incremental counter at the polling period $t_2$ (12)→−9. The row 318 includes a value of 16 for the incremental counter at a polling period of $t_4$. The delta at the polling period $t_4$ equals the current value of the incremental counter (16) minus the previous value of the incremental value at the polling period $t_3$ (3)→13. The row 320 includes a value of 17 for the incremental counter at a polling period of $t_5$. The delta at the polling period $t_5$ equals the current value of the incremental counter (17) minus the previous value of the incremental value at the polling period $t_4$ (16)→1. The row 322 includes a value of 18 for the incremental counter at a polling period of $t_6$. The delta at the polling period $t_6$ equals the current value of the incremental counter (18) minus the previous value of the incremental value at the polling period $t_5$ (17)→1.

Similar to the previous example of FIG. 2, for the polled data to be classified as normal data, the delta value should be a positive value because the value of the incremental counter should be increasing over time. Therefore, the polled data may be anomaly data if the delta is a negative value because the current value of the incremental counter is less than the previous value of the incremental counter in this situation. For the table 300, the only polling period having a delta that is negative is $t_3$.

To mark the polled data as anomaly data at polling period at $t_3$, the polling manager 104 needs to verify that the delta is not a negative value as a result of the counter being reset to its starting value. If the delta is a negative value because the counter has been reset, the polled data is not anomaly data. In some embodiments, the polling manager 104 can determine whether the counter has been reset by adding a large value (test add value) to the delta value. For example, the test add value can be $2^{32}$. If the result of adding the test add value to the delta value is greater than a threshold (e.g., two billion), the polling manager 104 determines that the delta value is negative because the counter has been reset. In this instance, the polled data is normal data (and it not an anomaly). Conversely, if the result of adding the test add value to the delta value is less than the threshold, the polling manager 104 determines that the delta value being negative is not the result of the counter being reset.

For this example, it is assumed that adding the test add value to the delta value is less than the threshold. Therefore, in this instance, the polled data at polling period at $t_3$ is anomaly data. In other words, the current counter value at the polling period $t_3$ is marked as anomaly data because the negative value is not a result of the counter being reset to its starting value. In contrast to FIG. 2, in FIG. 3, the next value is also affected by the anomaly data that occurred at the polling period $t_3$. In particular, the previous value needs to be cleared and not used in the next delta calculation. Otherwise, a delta value of 13 at the polling period $t_4$ would denote a spike or anomaly data. Accordingly, in some embodiments, in response to marking a current counter value as anomaly data, the next value is also marked as anomaly data even if the current data is not an anomaly. Such embodiments are in contrast to conventional approaches that only filter out the current value.

FIGS. 2-3 depict some examples of classifying or marking polled data as normal data or anomaly data. Additional examples of whether to classify or mark polled data as normal data or anomaly data is described in more detail below.

Example Graphs of Polled Data

Figure 4:
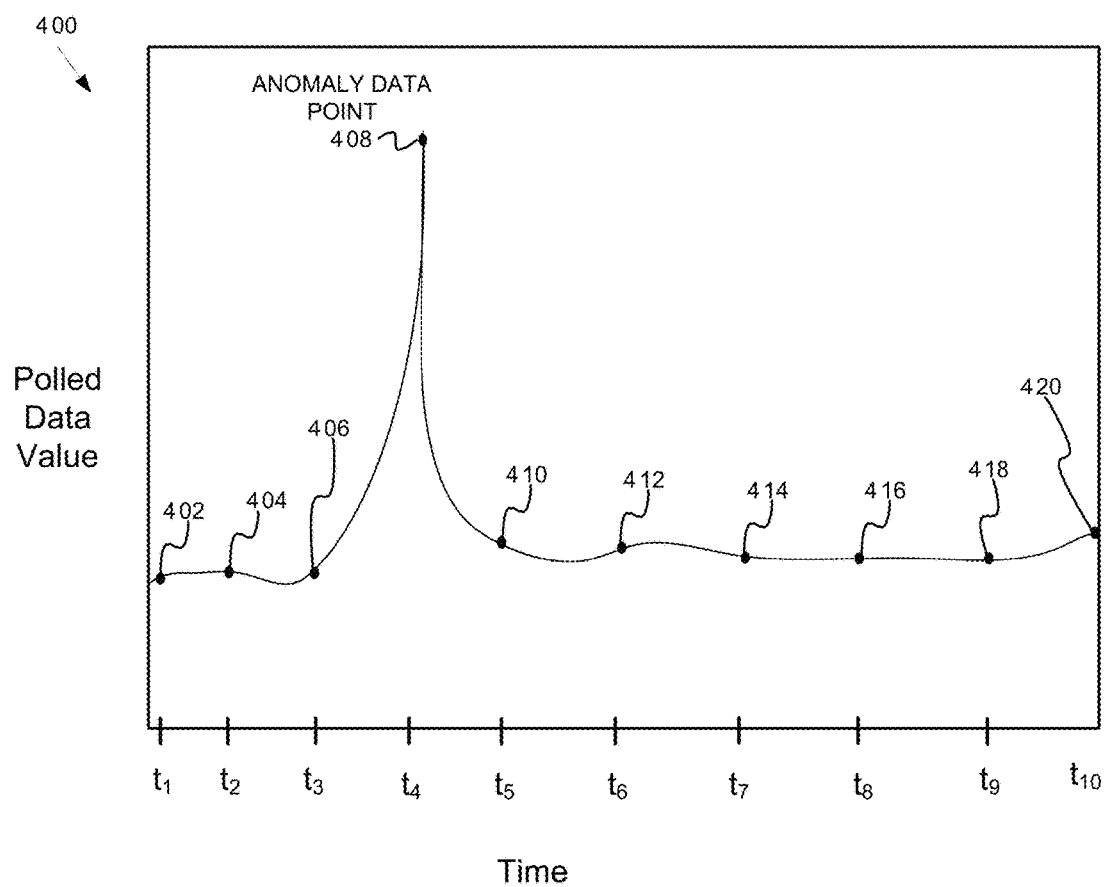
FIG. 4 depicts a graph of the polled data with anomaly data, according to some embodiments.
Figure 5:
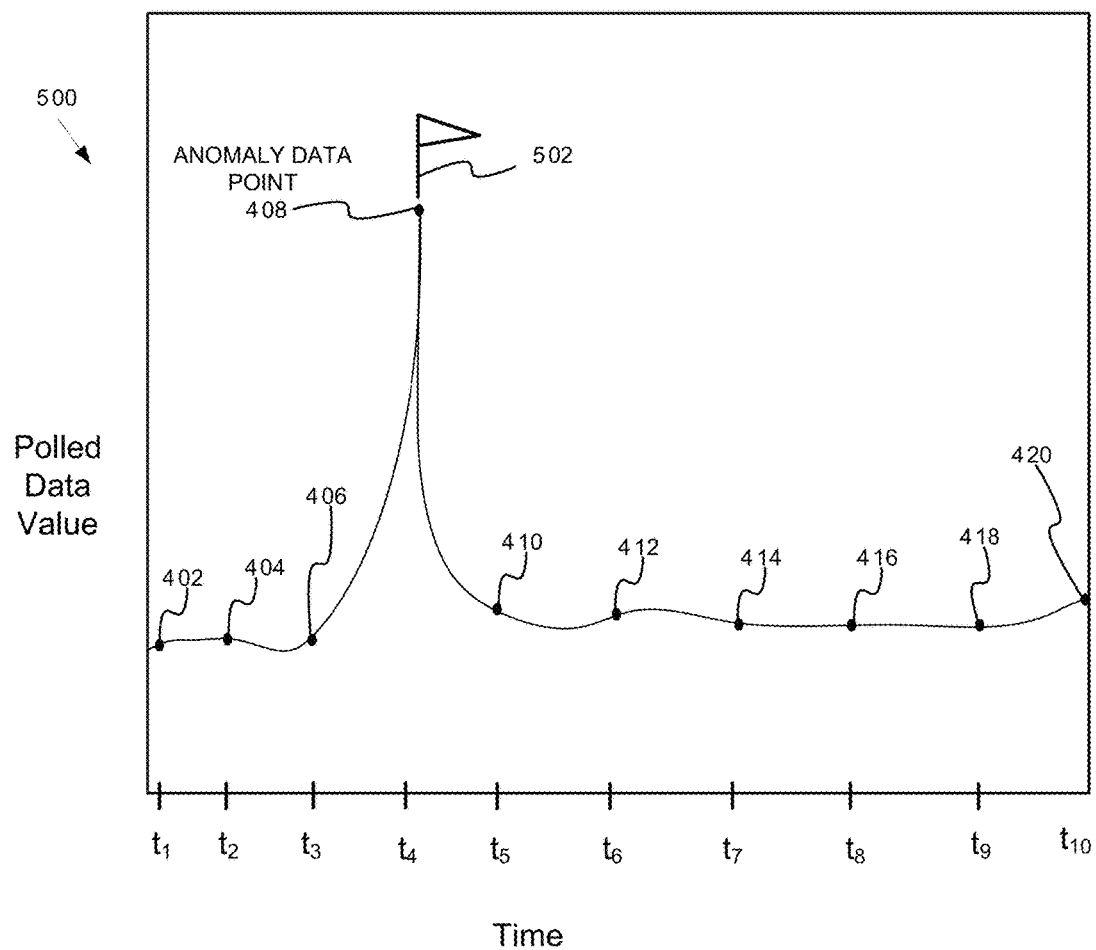
FIG. 5 depicts a graph of the polled data with anomaly data and including an anomaly data indicator, according to some embodiments.

FIGS. 4-8 are now described. FIGS. 5-6 depict graphs for a same polled data. In particular, FIGS. 4-5 depict graphs of the polled data that includes tracking of anomaly data, according to some embodiments. FIGS. 6-7 depict the graph of FIG. 4 without anomaly data while still providing notification of the anomaly data, according to some embodiments. FIG. 4 depicts a graph 400 that is a result of not using some embodiments. Conversely, FIGS. 6-7 depict graphs 600-700 that are a result of using some embodiments.

FIG. 4 depicts the graph 400 that includes polled data received in response to polling a device at periodic intervals. The graph 400 does not filter out the anomaly data, thereby skewing the graph 400 as a result of accounting for the anomaly data. The graph 400 is a two-dimensional line graph having a y-axis that tracks the values of the polled data and an x-axis that tracks the time of when the polling occurred.

The graph 400 includes normal data points 402, 404, 406, 410, 412, 414, 416, 418, and 420 representing normal data. The graph 400 also include an anomaly data point 408 representing anomaly data. The normal data point 402 is for a polling at time point $t_1$. The normal data point 404 is for a polling at time point $t_2$. The normal data point 406 is for a polling at time point $t_3$. The anomaly data point 408 is for a polling at time point $t_4$. The normal data point 410 is for a polling at time point $t_5$. The normal data point 412 is for a polling at time point $t_6$. The normal data point 414 is for a polling at time point $t_7$. The normal data point 416 is for a polling at time point $t_8$. The normal data point 418 is for a polling at time point $t_9$. The normal data point 420 is for a polling at time point $t_{10}$.

In creating the graph 400, a line is created along the different data points. In particular, the line is creating by connecting the normal data point 402 to the normal data point 404. The normal data point 404 is connected to the normal data point 406. The normal data point 406 is connected to the anomaly data point 408. The anomaly data point 408 is connected to the normal data point 410. The normal data point 410 is connected to the normal data point 412. The normal data point 412 is connected to the normal data point 414. Therefore, in FIG. 4, the anomaly data is used in plotting or creating the graph 400, which results in a skewed output at time point $t_4$ in comparison to the polled data at the other time points.

FIG. 5 depicts a graph of the polled data with anomaly data and including an anomaly data indicator, according to some embodiments. FIG. 5 depicts a graph 500 which is a modified version of the graph 400 of FIG. 4. Like the graph 400, the graph 500 includes the normal data points 402, 404, 406, 410, 412, 414, 416, 418, and 420 representing normal data and the anomaly data point 408 representing anomaly data. An anomaly marker 502 has been added at the anomaly data point 408 to indicate that anomaly data occurred at this point in the graph 500.

FIGS. 6-7 depict the graph of FIG. 4 without anomaly data while still providing notification of the anomaly data, according to some embodiments. FIG. 6 depicts a graph 600, and FIG. 7 depicts a graph 700. The graph 600 of FIG. 6 and the graph 700 of FIG. 7 are similar to the graph 400 of FIG. 4 but without using the anomaly data point 408 for plotting the graph. Like the graph 400, the graphs 600-700 include the normal data points 402, 404, 406, 410, 412, 414, 416,

418, and 420. However, the anomaly data point 408 is not included in the graphs 600-700.

In creating the graphs 600-700, a line is created along the different data points. In particular, the line is creating by connecting the normal data point 402 to the normal data point 404. The normal data point 404 is connected to the normal data point 406. There is a gap between the normal data point 406 and the next normal data point (the normal data point 410). This gap represents a time in the polling that included anomaly data. The normal data point 410 is connected to the normal data point 412. The normal data point 412 is connected to the normal data point 414.

Therefore, in FIGS. 6-7, the anomaly data is not used in plotting or creating the graphs 600-700. Also, in contrast to the graph 400 of FIG. 4, the graphs 600-700 include an anomaly marker 602 that provides an indication that anomaly data occurred at time point $t_4$ between the normal data point 406 and the normal data point 410. Therefore, even though the anomaly data is not used in plotting the graphs 600-700, the graphs 600-700 still include notification via the anomaly marker 602 that anomaly data occurred. Therefore, some embodiments allow a user to know that something went wrong (via the anomaly marker 602), while still allowing the user to view meaningful, "unskewed" data.

FIG. 7 also depicts a cursor 702 placed at the anomaly marker 602. For example, a user can move the cursor 702 using a mouse. In response to placement of the cursor 702 on or near the anomaly marker 602, detailed data 704 can be displayed to provide more information about the anomaly. In this example, the detailed data 704 includes the current polled value that caused the data to be marked as an anomaly. The detailed data 704 also includes the previous polled value and a timestamp defining when the polling occurred.

Figure 8:
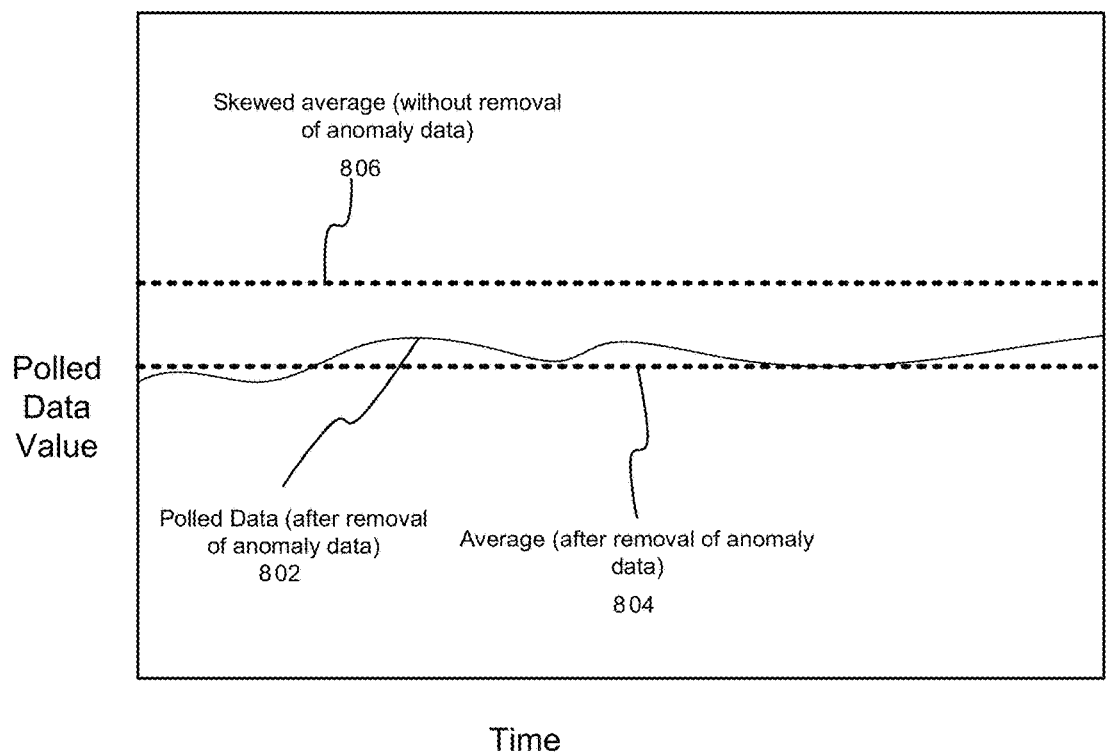
FIG. 8 depicts a graph that includes actual polled data, an average polled data that has been skewed by anomaly data, and an average polled data that has not been skewed by anomaly data, according to some embodiments.

FIG. 8 depicts a graph of the polled data without anomaly data along with an unskewed and skewed averages of the polled data, according to some embodiments. FIG. 8 helps illustrate the effects that anomaly data can have on a report providing an average of the polled data. A line graph 802 illustrates polled data values over time after anomaly data has been removed. In other words, the line graph 802 is derived from normal data and without using anomaly data. FIG. 8 also depicts an average 804 and an average 806. The average 804 is an average value of the polled data values included to create the line graph 802. In other words, the average 804 is derived from normal data and does not include anomaly data. Conversely, the average 806 is an average value that includes both the normal data and the anomaly data. FIG. 8 helps illustrate how a report providing an average for the polled data values can be skewed by anomaly data. The average 804 depicts a true average value of the polled data values. In contrast, the average 806 depicts a skewed average value of the polled data values cause by anomaly data.

This skewing or polluting of the normal data is further compounded as the data is rolled up into larger time groups. For example, a normal data value can be in a range of hundreds to thousands, while the anomaly data can be a value in the millions or billions. Accordingly, a single anomaly data can significantly level up other values after average rollup. For instance, assume the polling rate is five minutes. In this instance, the hourly rollup is 12 data points on average. The daily rollup is 288 data points on average. The weekly rollup is 2016 data points on average. Accordingly, for the weekly rollup, 2016 data points are used for an average calculation. Assume that one of these values is corrupted and is in the range of 1 billion, while the remaining values are normal and in the range of 500. If the corrupted data is not dropped as anomaly data, the weekly rollup will be:

$$(2015*500+1*1,000,000,000)/2016=496,531$$

Conversely, if the corrupted data is dropped as anomaly data, the weekly rollup will be:

$$(2015*500)/2015=500$$

Therefore, even if the error rate is less than 0.05% (1/2016), one single corruption is enough to complete distort and invalidate a whole week's data after rollup. Further, this example assumes a single device. More damage occurs if there are 10-20 devices in the network being monitored and having these anomalies or spikes. Because the distorted values can be so large relative to the normal data values and distortion is occurring across multiple devices, determining what is causing the anomalies can be especially problematic. Accordingly, incorporation of embodiments that eliminate the anomaly data as described herein can be especially useful when the data is rolled up over time and is combined across multiple devices.

Example Operations

Figure 9:
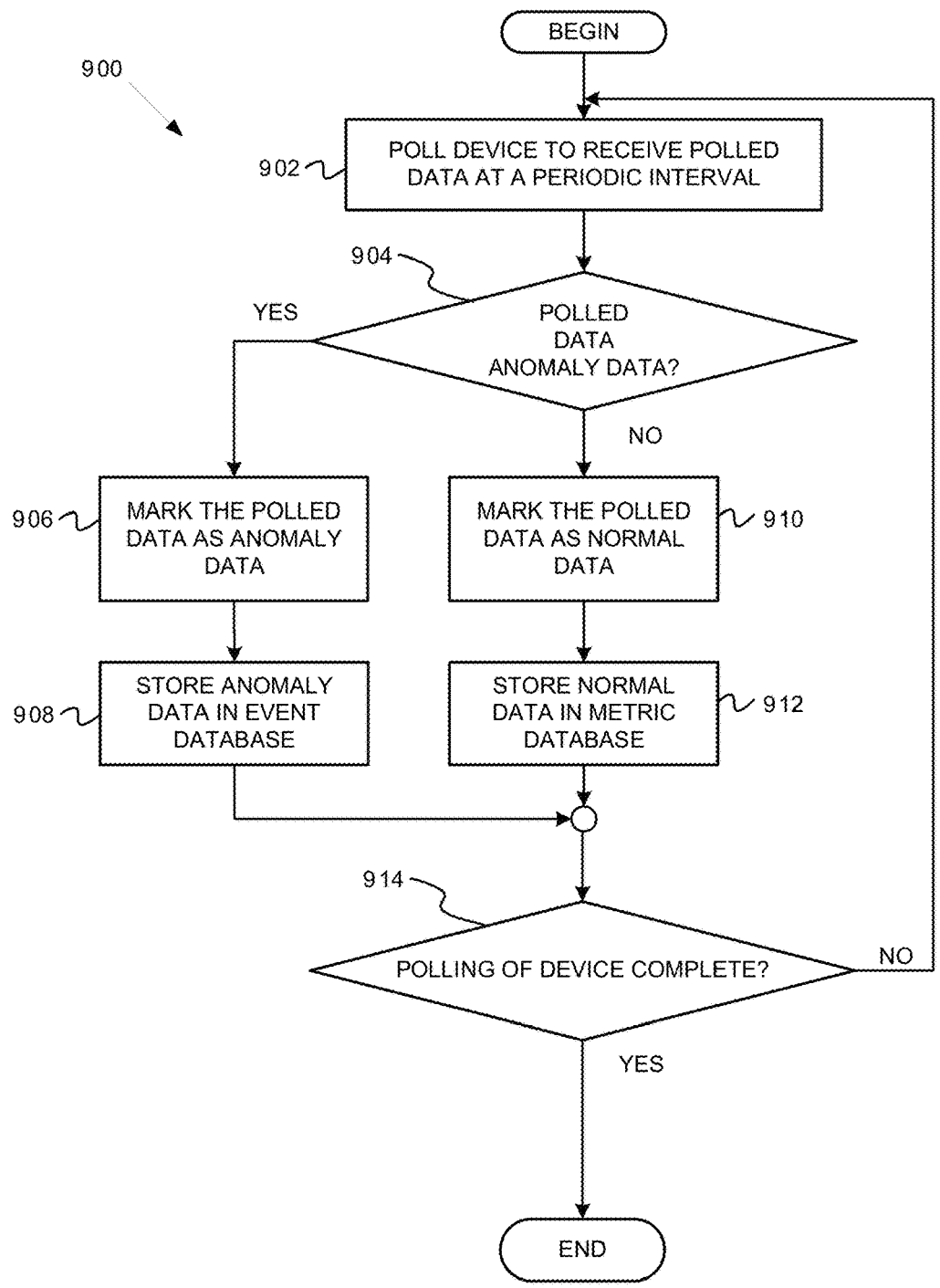
FIG. 9 depicts a flowchart for polling a device wherein anomaly data is filtered and separated from normal data, according to some embodiments.
Figure 10:
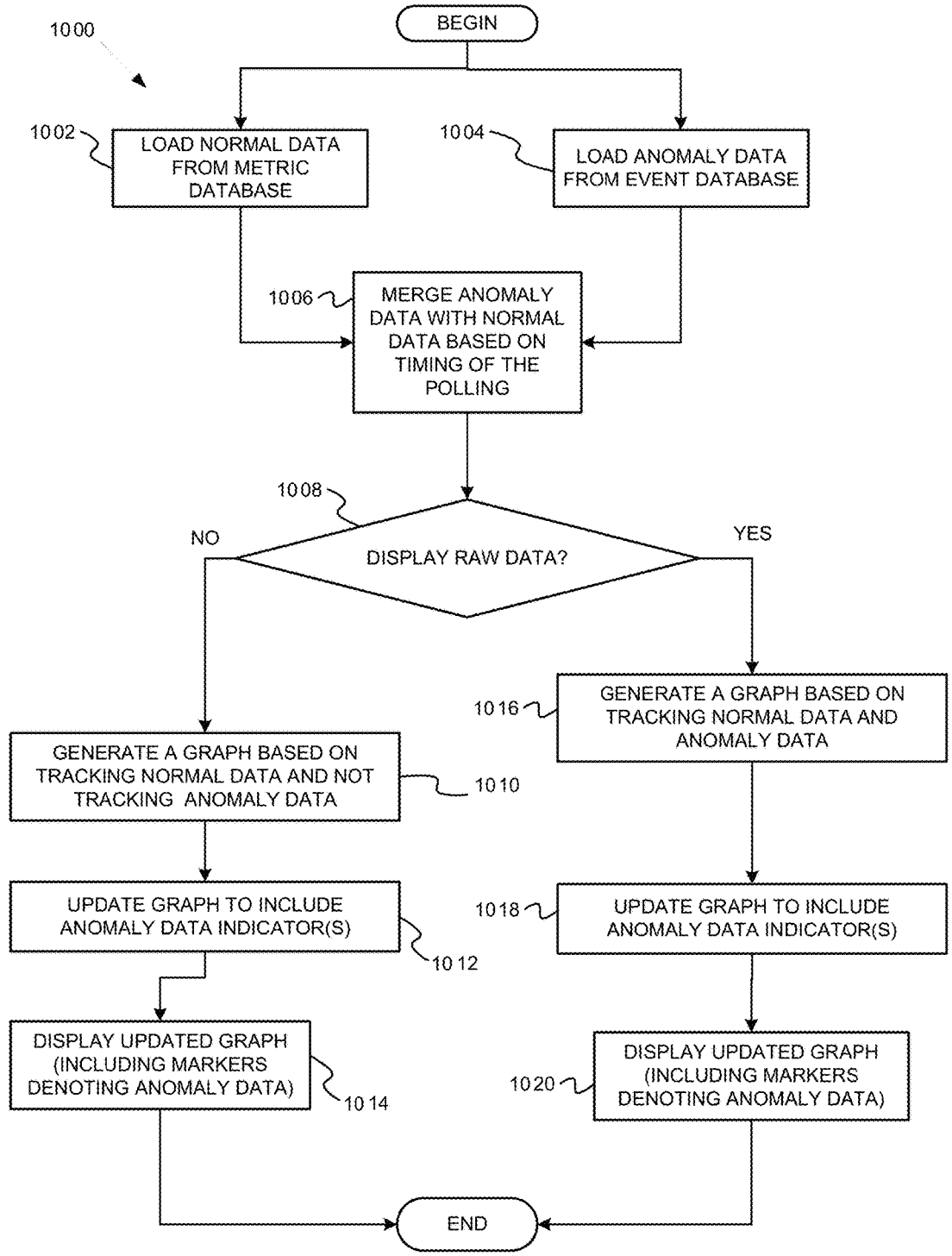
FIG. 10 depicts a flowchart for generating a graph of the polled data with use of normal data and anomaly data while still providing notification of the anomaly data, according to some embodiments.

To further illustrate operations of the system 100 of FIG. 1, FIGS. 9-10 are now described. FIG. 9 depicts a flowchart for polling a device wherein anomaly data is filtered and separated from normal data, according to some embodiments. A flowchart 900 is described with reference to FIG. 1. Operations of the flowchart 900 can be performed by software, firmware, hardware or a combination thereof (see for example the polling manager 104 in FIG. 1). The operations of the flowchart 900 start at block 902.

A device is polled to receive polled data (metric data) at a periodic interval (902). With reference to the example of FIG. 1, assume that the device being polled is the device 115. At stage A, the polling manager 104 polls (transmits a request to) the device 115 to request metrics related to the device 115's performance, health, etc.

A determination is then made of whether the polled data received in response to the poll is anomaly data (904). With reference to the example of FIG. 1, at stage C, the polling manager 104 receives the polled data back from the device 115. The polling manager 104 then determines whether the polled data is anomaly data or is normal data. As described above, determination of whether the polled data is anomaly data or is normal data can be based on various criteria. The definitions or criteria for "normal" are established for various data types and/or attributes being measured/monitored in advance and then applied to the polled data. A polling manager can load the criteria/definitions into relatively fast access memory (e.g., machine memory or cache) indexed by attribute identifier and/or data type. The polling manager can determine the data type and/or measured attribute (e.g., header of the polled data, polling session information with a descriptor(s) describing/indicating the measured attribute and/or data type received, etc.). With this information, the polling manager can access and apply the corresponding definition/criterion to the incoming polled data to make the determination of whether the polled data is anomaly data or normal data. In some embodiments, a polling manager can determine the incoming polled data (e.g., based on header information or session information) and invoke/spawn a thread for each monitored/measured attribute of the incoming polled data. Each invoked/spawned thread corresponds to a different attribute and applies a definition/criterion for that attribute. An example of this determination when the polled data is a value for an incremental counter is described above in reference to FIG. 2. In response to determining that the polled data is an anomaly, operations of the flowchart 900 continue at 906. Otherwise, operations of the flowchart 900 continue at 910.

The polled data is marked as anomaly data (906). With reference to the example of FIG. 1, the polling manager 104 marks this polled data as anomaly data. For example, the polling manager 104 can update a table that is tracking whether the polled data received at a given time interval is an anomaly or normal data. Alternatively or in addition, the polling manager 104 can mark the polled data as anomaly by updating metadata associated with the polled data.

The anomaly data is stored in an event database (908). With reference to the example of FIG. 1, at stage F, the polling manager 104 stores the anomaly data in the event database 112. For example, the polling manager 104 can store the anomaly data in a data structure (e.g., table) for this particular polled data for this particular device. For instance, each entry in the data structure can include the value of the anomaly data and a timestamp defining timing of when polling of the anomaly data occurred. Operations continue at 914 (described below).

If the polled data is not an anomaly, the polled data is marked as normal data (910). With reference to the example of FIG. 1, the polling manager 104 marks this polled data as normal data. For example, the polling manager 104 can update a table that is tracking whether the polled data received at a given time interval is an anomaly or normal data. Alternatively or in addition, the polling manager 104 can mark the polled data as normal by updating metadata associated with the polled data.

The normal data is stored in a metric database (912). With reference to the example of FIG. 1, at stage E, the polling manager 104 stores the normal data in the metric database 110. For example, the polling manager 104 can store the normal data in a data structure (e.g., table) for this particular polled data for this particular device. For instance, each entry in the data structure can include the value of the normal data and a timestamp defining timing of when polling of the normal data occurred. While described such that the normal data and anomaly data are stored in two different databases, in some other embodiments, the normal data and the anomaly data can be stored in two different data structures in a same database. In some other embodiments, the normal data and the anomaly data can be stored in a same data structure such that each data is defined as normal or anomaly data. These other embodiments still provide separation of the normal data from the anomaly data to enable reporting, graphing, etc. without skewing the data caused by the anomaly data (as further described below).

A determination is made of whether polling of the device is complete (914). With reference to the example of FIG. 1, the polling manager 104 makes this determination. For example, polling of the device can be configured to poll the device at regular time intervals for N number of times. After polling the device for the Nth time, the polling manager 104 determines that polling of the device is complete. In some instances, the polling can continue indefinitely. If indefinitely, the polling manager 104 can determine that polling of the device is complete after the device has been polled X number of times. The subsequent operations (e.g., plotting of graph—see below) can still occur even while polling of the device continues. If polling of the device is not complete, operations of the flowchart 900 return to 902 where the device is again polled. If polling of the device is complete, operations of the flowchart 900 are complete.

Results of the polling and classification of the polled data can then be used to create graphs, charts, reports, etc. For example, FIG. 10 depicts a flowchart for generating a graph of the polled data with use of normal data and anomaly data while still providing notification of the anomaly data, according to some embodiments. A flowchart 1000 is described with reference to FIG. 1. Operations of the flowchart 1000 can be performed by software, firmware, hardware or a combination thereof (see for example the polling manager 104 in FIG. 1). The operations of the flowchart 1000 start at block 1002.

The normal data for a particular polling for a particular device is loaded from the metric database (1002). With reference to the example of FIG. 1, the polling manager 104 can load the normal data for a particular polling of the device 115 from the metric database 110. For example, the normal data for polling of an incremental counter in the device 115 for a given time period can be loaded from the metric database 110. For instance, the polling manager 104 can retrieve the normal data for a particular polling of a particular device using a unique identifier (e.g., alphanumeric value). The polling manager 104 can then load the normal data into a volatile memory in the device 102.

The anomaly data for the same polling for the same device is loaded from the event database (1004). With reference to the example of FIG. 1, the polling manager 104 can load the anomaly data for this same polling for the same device from the event database 112. For instance, the polling manager 104 can retrieve the anomaly data for this same polling of the same device using the same unique identifier used to retrieve the normal data at 1002. The polling manager 104 can then load the anomaly data into a volatile memory in the device 102.

The anomaly data is merged with the normal data based on the timing of the polling (1006). With reference to the example of FIG. 1, the polling manager 104 merges the anomaly data with the normal data. For example, the polling manager 104 correlates the normal data and the anomaly data based on the timing of the polling. To illustrate, assume the polled data includes normal data at time points $t_1$, $t_2$, $t_4$, $t_5$, $t_7$, and $t_8$ and includes anomaly data at time points $t_3$, and $t_6$. In this example, the polling manager 104 merges the normal data with the anomaly data as follows: normal data at time point $t_1$ is followed by normal data at time point $t_2$ which is followed by anomaly data at time point $t_3$ which is followed by normal data at time point $t_4$ which is followed by normal data at time point $t_5$ which is followed by anomaly data at time point $t_6$ which is followed by normal data at time point $t_7$ which is followed by normal data at time point $t_8$.

A determination is made of whether to display raw data (that includes the normal data along with the anomaly data) (1008). With reference to the example of FIG. 1, the polling manager 104 makes this determination. For example, a user can input whether the data to be displayed in a report, chart, graph, etc. is to include the anomaly data or not. Based on this input, the polling manager 104 can make this determination of whether to display the raw data or not. If the raw data is not to be displayed, operations of the flowchart 1000 continue at 1010. Otherwise, operations of the flowchart 1000 continue at 1012.

A graph based on tracking the normal data (and not tracking the anomaly data) is generated (1010). With reference to the example of FIG. 1, the polling manager 104 generates the graph. For example, the graph 600 of FIG. 6 can be generated based on the normal data points 402, 404, 406, 410, 412, 414, 416, 418, and 420.

The graph is updated to include anomaly data indicator(s) (1012). With reference to the example of FIG. 1, the polling manager 104 updates the graph. For example, for each anomaly data, a flag or other marker can be placed in the graph where the anomaly data occurred relative to the normal data based on the time of the polling. With reference to the graph 600 of FIG. 6, anomaly data was polled between the normal data represented by the normal data point 406 and the normal data represented by the normal data point 410. Therefore, a flag is placed along the line graph between the normal data point 406 and the normal data point 410.

The updated graph (including the markers denoting the anomaly data) is displayed (1014). With reference to the example of FIG. 1, the polling manager 104 displays the updated graph. For example, the polling manager 104 displays the graph 119 on a display device. Operations of the flowchart 1000 are complete along this path.

A graph based on tracking the normal data and the anomaly data is generated (1016). With reference to the example of FIG. 1, the polling manager 104 generates the graph. For example, the graph 600 of FIG. 6 can be generated based on the normal data points 402, 404, 406, 410, 412, 414, 416, 418, and 420 and the anomaly data point 408.

The graph is updated to include anomaly data indicator(s) (1018). With reference to the example of FIG. 1, the polling manager 104 updates the graph. For example, for each anomaly data, a flag or other marker can be placed in the graph where the anomaly data occurred relative to the normal data based on the time of the polling. With reference to the graph 600 of FIG. 6, the anomaly marker 502 has been added at the anomaly data point 408 to indicate that anomaly data occurred at this point in the graph 500.

The updated graph (including the markers denoting the anomaly data) is displayed (1020). With reference to the example of FIG. 1, the polling manager 104 displays the updated graph. For example, the polling manager 104 displays the graph 119 on a display device. Operations of the flowchart 1000 are complete along this path.

Accordingly, a chart can be displayed with a graph of the polled data without use of anomaly data while still providing notification of the anomaly data. Additionally, a chart can be displayed with a graph of the polled data with normal data and anomaly data and which includes notification markers of the anomaly data.

Example Computer Device

FIG. 11 depicts an example computer device. With reference to FIG. 1, the computer device of FIG. 11 can represent the device 102. The computer device includes a processor 1101 (possibly including multiple processors, multiple cores, multiple nodes, and/or implementing multi-threading, etc.). The computer system includes memory 1107. The memory 1107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1103 (e.g., PCI, ISA, PCI-Express, HyperTransport® bus, InfiniBand® bus, NuBus, etc.) and a network interface 1105 (e.g., a Fiber Channel interface, an Ethernet interface, an internet small computer system interface, SONET interface, wireless interface, etc.). The system communicates via transmissions to and/or from remote devices via the network interface 1105 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The system also includes a polling manager 1111. As described above, the polling manager 1111 performs operations to poll for metric data and to filter out anomaly data from the metric data. The polling manager 1111 also stores the normal data and the anomaly data into separate databases. Additionally, the polling manager 1111 merges the normal data with the anomaly data to create a graph that tracks the normal data while still including notification of the anomaly data (as described above). Any one of the previously described functionalities may be partially (or entirely) implemented in hardware and/or on the processor 1101. For example, the functionality may be implemented with an application specific integrated circuit, in logic implemented in the processor 1101, in a co-processor on a peripheral device or card, etc. Further, realizations may include fewer or additional components not illustrated in FIG. 11 (e.g., video cards, audio cards, additional network interfaces, peripheral devices, etc.). The processor 1101 and the network interface 1105 are coupled to the bus 1103. Although illustrated as being coupled to the bus 1103, the memory 1107 may be coupled to the processor 1101.

Variations

While described in reference to creating and displaying line graphs, some embodiments can create any other types of graphs, charts, reports, etc. that include the filtering out of anomaly data while still providing notification of the anomaly data.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semi-conductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for filtering out anomaly data from normal data received from a polling a device and merging the filtered out anomaly data with the normal data for reports, charts, graphs, etc. as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
   for each of a plurality of time intervals over which metric data is collected from periodic polling of a network of devices,
      determining whether metric data of the time interval satisfies a criterion for normal data values defined for a metric corresponding to the metric data;
      marking the metric data as anomaly data, in response to determining that the metric data does not satisfy the criterion defined for the metric corresponding to the metric data of the time interval;
      marking the metric data as normal data, in response to determining that the metric data satisfies the criterion defined for the metric corresponding to the metric data of the time interval; and
      storing metric data marked as normal data and corresponding time intervals in a first database and metric data marked as anomaly data and corresponding time intervals in a second database;
   merging the metric data from the first database and the metric data from the second database based on a specified time frame; and
   generating a graph based, at least in part, on the merged data, wherein generating comprises,
      plotting the metric data from the first database in the graph without plotting the metric data from the second database in the graph; and
      positioning a marker representing the metric data from the second database based on one or more corresponding time intervals relative to the plotted metric data from the first database.

2. The method of claim 1, wherein generating the graph comprises generating a line graph wherein the line graph follows the plotting of the normal data without following the anomaly data.

3. The method of claim 1,
   wherein the metric data comprises a first metric data at a first time point, a second metric data at a second time point that is after the first time point, a third metric data at a third time point that is after the second time point, a fourth metric data at a fourth time point that is after the third time point, a fifth metric data at a fifth time point that is after the fourth time point,
   wherein the first metric data, the second metric data, the fourth metric data, and the fifth metric data are normal data, and wherein the third metric data is anomaly data,
   wherein plotting the metric data comprises,
      connecting a first point representing the first metric data to a second point representing the second metric data; and
      connecting a third point representing the fourth metric data to a fourth point representing the fifth metric data, wherein a gap remains between the second point and the third point to represent the anomaly data.

4. The method of claim 3, wherein positioning the marker comprises positioning the marker between the second point and the fourth point on the graph.

5. The method of claim 1,
wherein the metric data comprises a current value of an incremental counter,
wherein determining whether the metric data of the time interval satisfies the criterion comprises:
determining whether a delta between the current value of the incremental counter and a previous value of the incremental counter is positive;
in response to determining that the delta is not positive, determining whether the incremental counter has been reset in response to reaching a maximum value; and
in response to determining that the incremental counter has not been reset, determining that the metric data does not satisfy the criterion.

6. The method of claim 5,
wherein in response to determining that the delta is not positive and determining that the incremental counter has not been reset,
marking a next value of the incremental counter after the current value as anomaly data even when the next value satisfies the criterion.

7. The method of claim 5, wherein determining whether the incremental counter has been reset comprises:
adding a test add value to the delta to generate a combined value;
determining whether the combined value is less than a threshold; and
in response to determining that the combined value is less than the threshold, determining that the metric data does not satisfy the criterion.

8. An apparatus comprising:
a processor; and
a machine-readable medium having program code executable by the processor to cause the apparatus to:
for each of a plurality of time intervals over which metric data is collected from periodic polling of a network of devices,
determine whether metric data of the time interval satisfies a criterion for normal data values defined for a metric corresponding to the metric data;
mark the metric data as anomaly data, in response to a determination that the metric data does not satisfy the criterion defined for the metric corresponding to the metric data of the time interval;
mark the metric data as normal data, in response to a determination that the metric data satisfies the criterion defined for the metric corresponding to the metric data of the time interval;
store metric data marked as normal data and corresponding time intervals in a first database and metric data marked as anomaly data and corresponding time intervals in a second database;
merge the metric data from the first database and the metric data from the second database based on a specified time frame; and
generate a graph based, at least in part, on the merged data, wherein the program code executable by the processor to cause the apparatus to generate the graph comprises program code executable by the processor to cause the apparatus to,
plot the metric data from the first database in the graph without plotting the metric data from the second database in the graph; and
position a marker representing the metric data from the second database based on one or more corresponding time intervals relative to the plotted metric data from the first database.

9. The apparatus of claim 8, wherein the program code executable by the processor to cause the apparatus to generate the graph comprises program code executable by the processor to cause the apparatus to generate a line graph wherein the line graph follows the plotting of the normal data without following the anomaly data.

10. The apparatus of claim 8,
wherein the metric data comprises a first metric data at a first time point, a second metric data at a second time point that is after the first time point, a third metric data at a third time point that is after the second time point, a fourth metric data at a fourth time point that is after the third time point, a fifth metric data at a fifth time point that is after the fourth time point,
wherein the first metric data, the second metric data, the fourth metric data, and the fifth metric data are normal data, and wherein the third metric data is anomaly data,
wherein the program code executable by the processor to cause the apparatus to plot the metric data comprises program code executable by the processor to cause the apparatus to,
connect a first point representing the first metric data to a second point representing the second metric data; and
connect a third point representing the fourth metric data to a fourth point representing the fifth metric data, wherein a gap remains between the second point and the third point to represent the anomaly data.

11. The apparatus of claim 10, wherein the program code executable by the processor to cause the apparatus to position the marker comprises program code executable by the processor to cause the apparatus to position the marker between the second point and the fourth point on the graph.

12. The apparatus of claim 8,
wherein the metric data comprises a current value of an incremental counter,
wherein the program code executable by the processor to cause the apparatus to determine whether the metric data of the time interval satisfies the criterion comprises program code executable by the processor to cause the apparatus to:
determine whether a delta between the current value of the incremental counter and a previous value of the incremental counter is positive;
in response to a determination that the delta is not positive, determine whether the incremental counter has been reset in response to reaching a maximum value; and
in response to a determination that the incremental counter has not been reset, determine that the metric data does not satisfy the criterion.

13. The apparatus of claim 12,
wherein the program code comprises program code executable by the processor to cause the apparatus to in response to a determination that the delta is not positive and in response to a determination that the incremental counter has not been reset,
mark a next value of the incremental counter after the current value as anomaly data even when the next value satisfies the criterion.

14. The apparatus of claim 12, wherein the program code executable by the processor to cause the apparatus to determine whether the incremental counter has been reset comprises program code executable by the processor to cause the apparatus to:
add a test add value to the delta to generate a combined value;
determine whether the combined value is less than a threshold; and
in response to a determination that the combined value is less than the threshold, determine that the metric data does not satisfy the criterion.

15. One or more machine-readable storage media having program code stored therein, the program code comprising instructions to:
poll a device periodically to receive metric data at periodic intervals to create a group of metric data that define a metric of the device, wherein the group of metric data comprises a first metric data at a first time point, a second metric data at a second time point that is after the first time point, a third metric data at a third time point that is after the second time point, a fourth metric data at a fourth time point that is after the third time point, a fifth metric data at a fifth time point that is after the fourth time point;
for each metric data in the group of metric data,
determine whether the metric data satisfies a criterion for normal data values defined for the metric;
mark the metric data as anomaly data, in response to a determination that the metric data does not satisfy the criterion for normal data values; and
mark the metric data as normal data, in response to a determination that the metric data does satisfy the criterion for normal data values;
merge the normal data and the anomaly data based on a specified time frame;
plot the normal data in a graph without plotting the anomaly data in the graph, wherein the first metric data, the second metric data, the fourth metric data, and the fifth metric data are normal data, and wherein the third metric data is anomaly data,
wherein the instructions to plot the normal data in the graph comprises instructions to,
connect a first point representing the first metric data to a second point representing the second metric data;
connect a third point representing the fourth metric data to a fourth point representing the fifth metric data, wherein a gap remains between the second point and the third point to represent the anomaly data; and
position a marker representing the anomaly data in the gap between the second point and the third point.

16. The one or more machine-readable storage media of claim 15,
wherein the metric data comprises a current value of an incremental counter,
wherein the instructions to determine whether the metric data satisfies the criterion for normal data values comprises instructions to:
determine whether a delta between the current value of the incremental counter and a previous value of the incremental counter is positive;
in response to a determination that the delta is not positive, determine whether the incremental counter has been reset in response to reaching a maximum value; and
in response to a determination that the incremental counter has not been reset, determine that the metric data does not satisfy the criterion.

17. The one or more machine-readable storage media of claim 16, wherein the program code comprises instructions to:
in response to a determination that the delta is not positive and in response to a determination that the incremental counter has not been reset,
mark a next value of the incremental counter after the current value as anomaly data even when the next value satisfies the criterion.

18. The one or more machine-readable storage media of claim 16, wherein the instructions to determine whether the incremental counter has been reset comprises instructions to:
add a test add value to the delta to generate a combined value;
determine whether the combined value is less than a threshold; and
in response to a determination that the combined value is less than the threshold, determine that the metric data does not satisfy the criterion.

19. The one or more machine-readable storage media of claim 15, wherein the program code comprises instructions to:
in response to the determination that the metric data does not satisfy the criterion for normal data values, store the anomaly data in an event database.

20. The one or more machine-readable storage media of claim 15, wherein the program code comprises instructions to:
in response to the determination that the metric data does satisfy the criterion for normal data values, store the metric data as normal data in a metric database without the anomaly data.

* * * * *